United States Patent

[11] 3,542,328

[72] Inventor Rollin E. Deitrick
    Winston-Salem, North Carolina
[21] Appl. No. 800,438
[22] Filed Feb. 19, 1969
[45] Patented Nov. 24, 1970
[73] Assignee Western Electric Company, Incorporated
    New York, New York
    a corporation of New York

[54] MOLD HAVING V-SHAPED GUIDES TO PREVENT PINCHING A LEAD ON A COMPONENT DURING AN ENCAPSULATION PROCESS
8 Claims, 5 Drawing Figs.
[52] U.S. Cl. .................................................. 249/95,
    18/36, 18/42
[51] Int. Cl. ........................................................ B22d 19/04
[50] Field of Search ........................................... 18/36,
    42DM; 249/95, 96, 97

[56] References Cited
UNITED STATES PATENTS

| | | | |
|---|---|---|---|
| 2,176,604 | 10/1939 | Benkelman | 18/36UX |
| 2,425,832 | 8/1947 | Lubbert et al. | 18/36 |
| 3,093,432 | 6/1963 | King. | |
| 3,142,716 | 7/1964 | Gardener | 249/95X |
| 3,221,089 | 11/1965 | Cotton | 18/36X |
| 3,257,709 | 6/1966 | Fernan et al. | 18/36X |
| 3,471,900 | 10/1969 | Burns | 249/95X |

FOREIGN PATENTS
1,165,052  5/1958  France.

Primary Examiner—J. Howard Flint, Jr.
Attorneys—S. Gundersen, H. J. Winegar and R. P. Miller ABSTRACT: A pair of mold halves have extending and cooperating guide members, one on each mold half, with opposed V-shaped notches for positioning a lead within a passageway when the mold halves are closed. One guide member extends into a runner formed in the opposite mold half for directing molded plastic to cavities in the mold.

Patented Nov. 24, 1970

INVENTOR
R. E. DEITRICK
By D. W. Marko
ATTORNEY

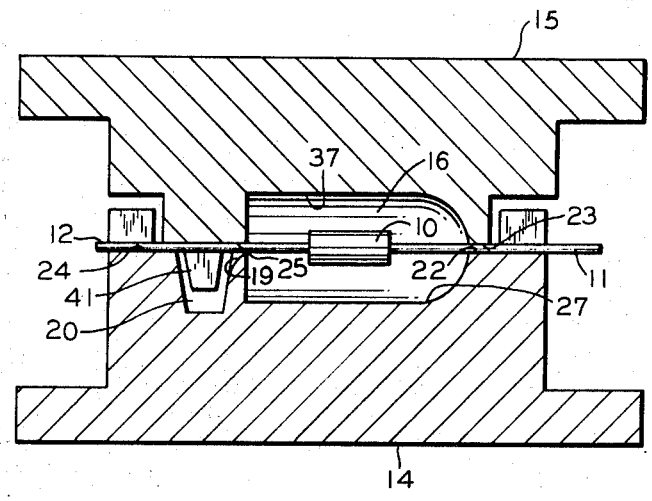
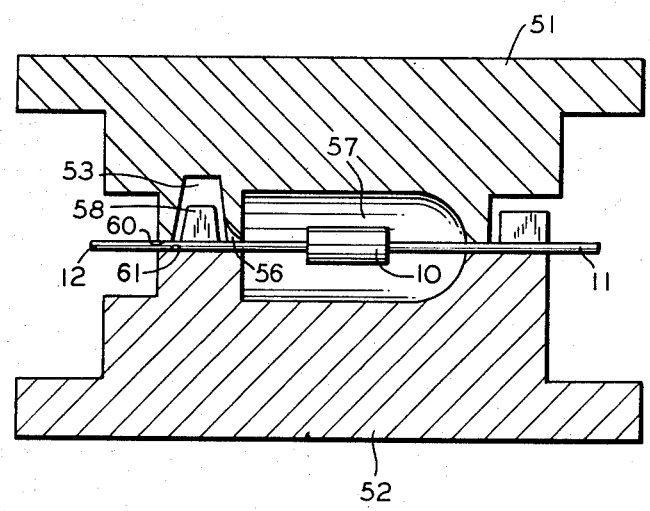

3,542,328

MOLD HAVING V-SHAPED GUIDES TO PREVENT PINCHING A LEAD ON A COMPONENT DURING AN ENCAPSULATION PROCESS

BACKGROUND OF THE INVENTION

1. Field of the Invention

The invention relates to molds for encapsulating components with extending leads. The molds usually are made in two halves such that each half contains a plurality of cavities, each cavity mating with a respective cavity in the opposite mold half to form a chamber in which plastic material is formed around a component. Also, each mold half is formed with grooves, each groove mating with a respective groove in the opposite mold half to form a passageway extending from a chamber for receiving and tightly enclosing a lead to prevent excessive plastic material from escaping from the chamber. The components are placed within the cavities in the lower mold half with the leads placed in the grooves in the lower mold half. The top mold half is then closed to encapsulate the components. Often times the leads extending from the components may be bent such that they do not lay in the grooves formed in the lower mold half. Thus, when the halves are closed, the leads are pinched and deformed between the mold halves producing a component which is not acceptable. This invention concerns facilities for guiding bent leads into the grooves in the mold halves to prevent the pinching of leads when two mold halves are closed.

2. Description of the Prior Art

Prior art molds have a pair of bars or guides, one on each side of a row of the cavities formed in the lower mold half. These guides have V-shaped notches terminating in respective lead receiving grooves in the lower mold half to guide the leads of the components when the two halves of the mold are closed. However, when the mold is a transfer mold, a runner is also provided in the lower half of the mold for directing molten plastic into the cavities. The runner is positioned between one of the wire guides and the cavities such that if a component lead extending across the runner is not straight, the V-shaped notch guiding that lead is not effective in preventing the pinching of the lead when the mold halves are closed.

SUMMARY OF THE INVENTION

An object of the invention is a new and improved molding apparatus with facilities for preventing the pinching of leads when two mold halves are closed.

In accordance with this and other objects, the invention contemplates a pair of opposed wire guides, one on each mold half with cooperating V-shaped notches formed in each wire guide for precisely positioning a lead within mating grooves forming a passageway extending from a cavity in the mold. One of the wire guides extends into a runner formed in the opposite mold half to accurately position that portion of each lead which extends across the runner.

BRIEF DESCRIPTION OF THE DRAWING

FIG. 4 is a side cross-sectional view of the mold particularly showing the upper and the lower mold halves in a closed position; and FIG. 5 is a side cross-sectional view of an alternative mold embodying the principles of the invention.

DETAILED DESCRIPTION

Figure 1:
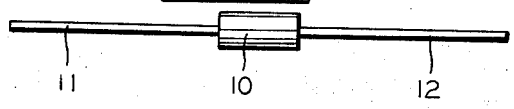
FIG. 1 is a view of a component to be encapsulated by the invention.

Referring first to FIG. 1, there is shown a component 10 having leads 11 and 12 extending axially there from. During the process of the manufacture of the component 10, the leads 11 and 12 may become bent such that they do not extend along the axis of the component.

Referring to FIG. 4, a mold has a bottom half 14 and an upper half 15 machined from a suitable material such as metal. The mold halves 14 and 15 contain respective mating cavities 27 and 37 which form an enclosed encapsulation chamber 16 when the halves 14 and 15 are closed. The component 10 is placed with the chamber 16 with the lead 11 extending through a passageway formed by a groove 22 in the lower mold half 14 mating with a groove 23 in the upper mold half 15. The lead 12 extends through a passageway formed by a groove 24 in the lower mold half 14 and a groove 25 in the upper mold half 15. Molten plastic is injected into chamber 16 through an opening 19 communicating with a runner 20 formed in the lower mold half 14. The grooves 22, 23, 24 and 25 are formed to tightly enclose the leads 11 and 12 to prevent the escape of an excess of plastic material from the chamber 16.

Figure 2:
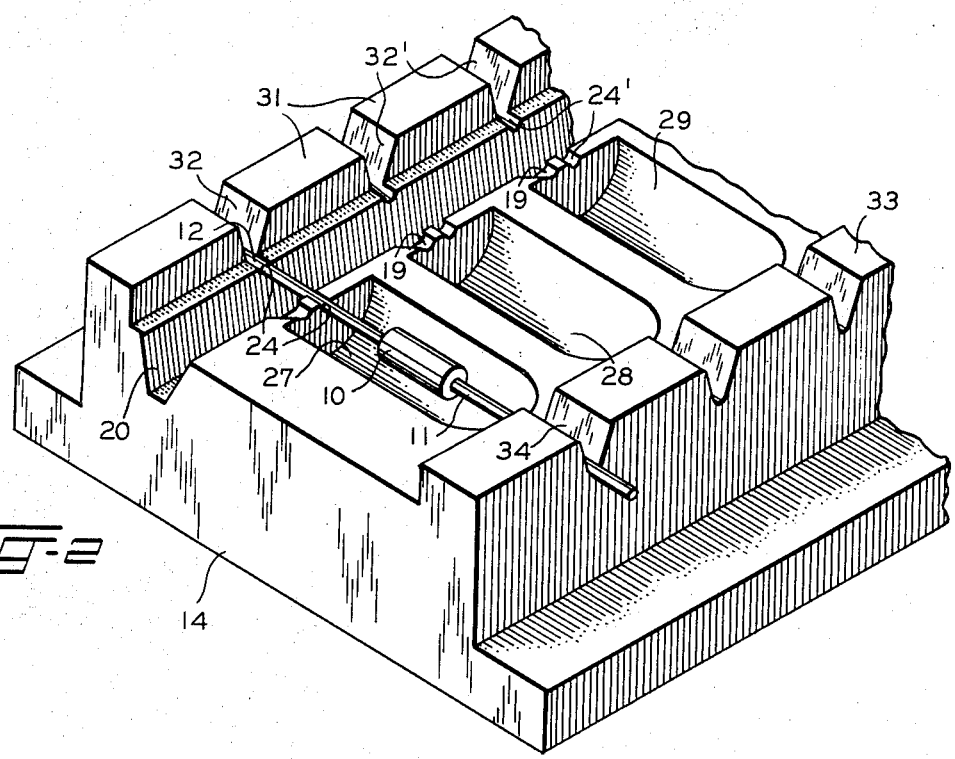
FIG. 2 is an isometric view of a bottom half of a mold made in accordance with the invention.

Referring to FIG. 2, there is shown the bottom half 14 of a mold containing a plurality of cavities 27, 28 and 29, all formed in a row. The cavity 27 forms the lower half of the chamber 16 as shown in FIG. 4. The groove 24 extends from the cavity 27 transversely to the row of cavities 27, 28 and 29. A guide member or ridge 31 formed parallel to the row of cavities 27, 28 and 29 has a V-shaped notch 32 which is formed in line with the groove 24 such that the lead 12 lays along the groove 24 and the bottom of the notch 32. The runner 20 is formed between the guide member 31 and the row of cavities 27, 28 and 29 such that the groove 24 is separated into two portions by the runner 20. A guide member or ridge 33 on the opposite side of the row of cavities 27, 28 and 29 has a V-shaped notch 34 which communicates with the passageway 22 (not shown in FIG. 2) for receiving the lead 11 of the component 10. Similar grooves 24' in the mold half 14 and V-Shaped notches 32' and 34' in the members 31 and 33 are provided for the other cavities 28 and 29.

Figure 3:
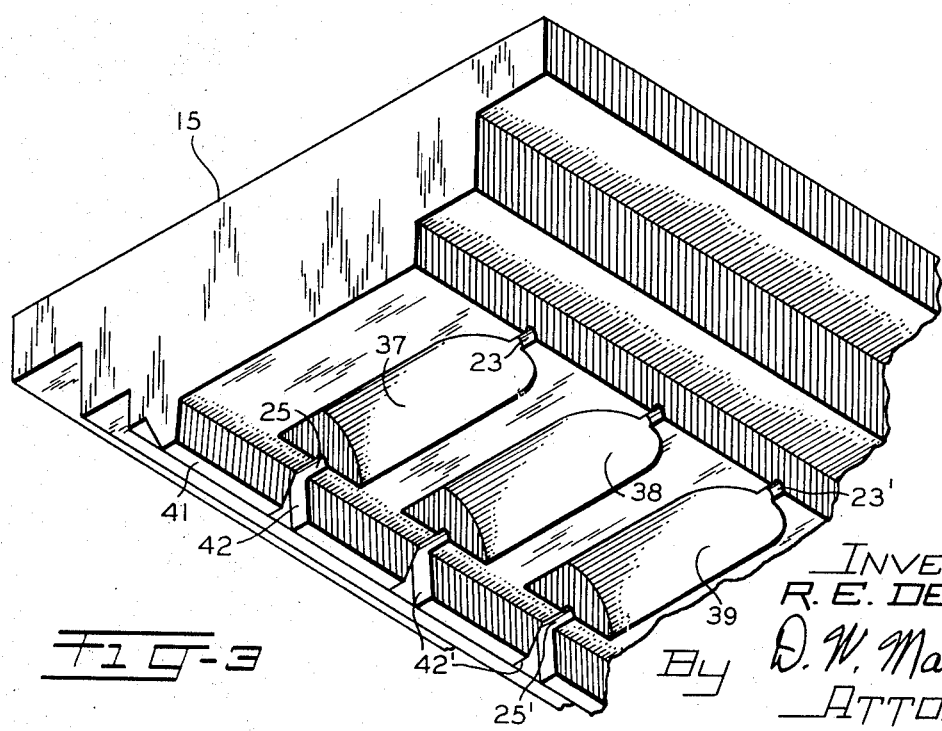
FIG. 3 is an isometric view of a top half of a mold constructed in accordance with the invention.

Referring now to FIG. 3, there is shown the upper half 15 of the mold. The upper mold half 15 has a plurality of cavities 37, 38 and 39 formed therein to mate with the respective cavities 27, 28 and 29 of the lower mold half 14 to form respective encapsulating chambers. For example, the cavity 37 forms the upper half of the chamber 16 shown in FIG. 4. A guide member or ridge 41 extends downward from the upper mold half 15 for mating with the runner 20 formed in the lower mold half 14. As shown in FIG. 4, the member 41 has a tapered cross section formed to extend into the runner 20 without blocking the flow of plastic through the runner 20 to the openings into the encapsulation chambers. Referring back to FIG. 3, the member 41 has a V-shaped notch 42 which is in line with and communicates with the groove 25. The V-shaped notch 42 in the member 41 cooperates with the V-shaped notch 32 in the member 31 (FIG. 2) to accurately position the lead in the passageway formed by grooves 24 and 25 when the mold halves 14 and 15 close. This prevents pinching of the lead 12 which would produce a component which is not acceptable. Similar grooves 23' and 25' in the mold half 15 and V-shaped notches 42' in the member 41 are provided for the other cavities 38 and 39.

Referring to FIG. 5, there is shown an alternative embodiment having an upper mold half 51 and a lower mold half 52. A runner 53 is formed in the upper mold half 51 for directing molten plastic to an opening 56 communicating with an encapsulation chamber 57. A guide member or ridge 58 on the lower mold half 52 extends into the runner 53. The guide member 58 is formed with a tapered cross section sufficiently small to allow molten plastic to freely flow through the runner 53. The guide member 58 has a V-shaped notch to guide a lead 12 into grooves 60 and 61 formed in the upper and lower mold halves 51 and 52, respectively, similar to the V-shaped notch 42 in the member 41 of FIG. 3.

I claim:

1. A mold for encapsulating a component having a lead extending therefrom, comprising:

a pair of mold halves which when closed form (1) a chamber for receiving the component to be encapsulated and (2) a passageway for receiving the lead, each mold half forming at least a portion of the wall of both the chamber and passageway; and a pair of extending and cooperating members, one on each mold half, with opposed V-shaped notches, one in each member, for positioning a lead within the passageway when the mold halves are closed.

2. A mold for encapsulating a plurality of components, each having a lead extending therefrom, comprising:

a pair of mold halves which when closed form (1) a plurality of chambers each for receiving a component to be encapsulated, and (2) a plurality of passageways, each extending from a chamber for receiving a lead; each mold half forming at least a portion of the wall of each chamber and passageway; and a pair of extending and cooperating members adjacent at least one passageway and chamber, one member on each mold half, and each member having an opposed V-shaped notch for positioning a lead within the one passageway when the mold halves are closed.

3. A mold for encapsulating a plurality of components, each having a lead extending therefrom, comprising:

a pair of mold halves which when closed form (1) a plurality of chambers, all formed in a row, each chamber for receiving a component to be encapsulated, and (2) a plurality of passageways, each extending from a chamber transversely from the row of chambers for receiving a lead; each mold half forming at least a portion of the wall of each chamber and passageway; and a pair of extending and cooperating ridges, one ridge on each mold half, adjacent the row of chambers and extending across the plurality of passageways with a plurality of V-shaped notches, one notch in each ridge extending from each passageway for guiding and positioning a lead in each passageway when the mold halves are closed.

4. A transfer mold for encapsulating a plurality of components, each having a lead extending therefrom, comprising:

first and second mold halves which when closed form (1) a plurality of chambers, each chamber for receiving a component to be encapsulated, and (2) a plurality of passageways, each extending from a chamber for receiving a lead; each mold half forming at least a portion of the wall of each chamber and passageway;

said first mold half having a runner formed therein for directing molten plastic to each of the chambers; and wherein the runner crosses at least one passageway extending from a chamber; and a projecting member on said second mold half for extending into the runner in the first mold half; said member having a V-shaped notch for positioning a lead within the one passageway when the first and second mold halves are closed.

5. A transfer mold for encapsulating a plurality of components, each having a lead extending therefrom, comprising:

first and second mold halves which when closed form (1) a plurality of chambers, all formed in a row, each chamber for receiving a component to be encapsulated, and (2) a plurality of passageways, each extending from a chamber transversely from the row of chambers for receiving a lead; each mold half forming at least a portion of the wall of each chamber and passageway;

said first mold half having a runner formed therein parallel to the row of chambers for directing molten plastic to each of the chambers; and wherein the runner crosses the passageways extending from the chambers; and a ridge on said second mold half parallel to the row of chambers for extending into the runner in the first mold half; said ridge having a plurality of V-shaped notches, each for positioning a lead in a passageway when the mold halves are closed.

6. A transfer mold for encapsulating a plurality of components, each having a lead extending therefrom, comprising:

first and second mold halves which when closed form (1) a plurality of chambers, all formed in a row, each chamber for receiving a component to be encapsulated, and (2) a plurality of passageways, each extending from a chamber transversely from the row of chambers for receiving a lead; each mold half forming at least a portion of the wall of each chamber and passageway;

said first mold half having (1) a first ridge parallel to the row of chambers and crossing the passageways with a plurality of V-shaped notches formed in the ridge, one notch extending along each passageway, and (2) a runner formed therein between the ridge and the row of chambers for directing molten plastic to each of the chambers; and a second ridge on said second mold half parallel to the row of chambers for extending into the runner in the first mold half: said second ridge having a plurality of V-shaped notches, each for cooperating with a V-shaped notch in the first ridge to position a lead in a passageway when the mold halves are closed.

7. A transfer mold for encapsulating a plurality of components, each having a pair of leads extending axially therefrom, comprising:

first and second mold halves which when closed form (1) a plurality of chambers, all formed in a row, each chamber for receiving a component to be encapsulated, and (2) a plurality of pairs of passageways, one pair extending axially from each chamber and transversely from the row of chambers for receiving respective pairs of leads: each mold half forming at least a portion of the wall of each chamber and passageway;

said first mold half having (1) a first ridge parallel to the row of chambers and crossing a first of each pair of passageways extending from respective chambers with a plurality of V-shaped notches formed in the ridge, one notch extending along each first passageway, (2) a second ridge parallel to the row of chambers and crossing the second of each pair of passageways extending from respective chambers with a plurality of V-shaped notches formed in the ridge, one notch extending along each second passageway; and (3) a runner formed therein between the first ridge and the row of chambers for directing molten plastic to each of the chambers; and a third ridge on said second mold half parallel to the row of chambers for extending into the runner in the first mold half; said third ridge having a plurality of V-shaped notches, each for cooperating with a V-shaped notch in the first ridge to position a lead in a passageway when the mold halves are closed.

8. A transfer mold for encapsulating a plurality of components, each having a pair of leads extending axially therefrom, comprising:

first and second mold halves which when closed form (1) a plurality of chambers, all formed in a row, each chamber for receiving a component to be encapsulated, and (2) a plurality of pairs of passageways, one pair extending axially from each chamber and transversely from the row of chambers for receiving respective pairs of leads, each mold half forming at least a portion of the wall of each chamber and passageway;

said first mold half having a runner formed therein parallel to the row of chambers and crossing a first of each pair of passageways for directing molten plastic to each of the chambers; and said second mold half having (1) a first ridge parallel to the row of chambers for extending into the runner in the first mold half, the first ridge having a plurality of V-shaped notches for guiding leads into the first passageways when the mold halves are closed; and (2) a second ridge parallel to the row of chambers and crossing the second of each pair of passageways, the second ridge having a plurality of V-shaped notches for guiding leads into the second passageways when the mold halves are closed.